United States Patent
Donk et al.

(10) Patent No.: US 11,138,588 B2
(45) Date of Patent: Oct. 5, 2021

(54) METHOD, ELECTRONIC TRANSACTION INSTRUCTION SYSTEM, SALES UNIT, TRANSACTION SERVER AND COMPUTER PROGRAM PRODUCT FOR EXECUTING AN ELECTRONIC TRANSACTION INSTRUCTION

(71) Applicant: MDT IE Holding B.V., Breda (NL)

(72) Inventors: Farley Douglas Glenn Donk, Breda (NL); Johannes Hermanus Petrus Oonk, Breda (NL)

(73) Assignee: MDT IE HOLDING B.V., Breda (NL)

( * ) Notice: Subject to any disclaimer, the term of this patent is extended or adjusted under 35 U.S.C. 154(b) by 452 days.

(21) Appl. No.: 15/762,024

(22) PCT Filed: Sep. 21, 2016

(86) PCT No.: PCT/NL2016/050647
§ 371 (c)(1),
(2) Date: Mar. 21, 2018

(87) PCT Pub. No.: WO2017/052365
PCT Pub. Date: Mar. 30, 2017

(65) Prior Publication Data
US 2018/0268395 A1 Sep. 20, 2018

(30) Foreign Application Priority Data

Sep. 21, 2015 (NL) .................................. 2015477

(51) Int. Cl.
*G06Q 20/32* (2012.01)
*G06Q 20/20* (2012.01)
(Continued)

(52) U.S. Cl.
CPC .......... *G06Q 20/325* (2013.01); *G06Q 20/20* (2013.01); *G06Q 20/202* (2013.01); *G06Q 20/32* (2013.01); *G06Q 20/385* (2013.01); *G06Q 50/01* (2013.01)

(58) Field of Classification Search
CPC ...... G06Q 20/325; G06Q 20/20; G06Q 20/32; G06Q 20/202; G06Q 20/385; G06Q 50/01
(Continued)

(56) References Cited

U.S. PATENT DOCUMENTS

| | | | | |
|---|---|---|---|---|
| 2007/0194113 A1* | 8/2007 | Esplin | .................. | G06Q 20/204 235/383 |
| 2011/0071914 A1* | 3/2011 | Beasley | ............... | G06Q 20/202 705/21 |

OTHER PUBLICATIONS

PCT International Search Report and Written Opinion of the International Searching Authority (PCT/ISA/210 and PCT/ISA/237) by the ISA European Patent Office dated Dec. 6, 2016 for PCT application No. PCT/NL16/50647 filed Sep. 21, 2016 and published as WO 2017/052365 on Mar. 30, 2017.

* cited by examiner

*Primary Examiner* — Garcia Ade
(74) *Attorney, Agent, or Firm* — Suiter Swantz pc llo

(57) ABSTRACT

The invention relates to a method for providing and executing, by a transaction server, of a payments service, which payment service is executed over a sales channel between at least two user registered to the service, the user being at least a buyer and at least a merchant, wherein the transaction server can be accessed through the sales channel by the communication unit of the at least one buyer and can be accessed by the sales unit of the at least one merchant, for (Continued)

processing the electronic transaction instruction as well as further commercial agreements between the buyer and the at least one merchant.

12 Claims, 2 Drawing Sheets

(51) Int. Cl.
  *G06Q 20/38* (2012.01)
  *G06Q 50/00* (2012.01)
(58) Field of Classification Search
  USPC .......................................................... 705/21
  See application file for complete search history.

METHOD, ELECTRONIC TRANSACTION INSTRUCTION SYSTEM, SALES UNIT, TRANSACTION SERVER AND COMPUTER PROGRAM PRODUCT FOR EXECUTING AN ELECTRONIC TRANSACTION INSTRUCTION

TECHNICAL FIELD

The invention relates to a method for a transaction server by the provision and execution of a payment service which payment service is carried out over a distribution channel between at least two users registered to the service, being at least one buyer and at least one vendor.

The invention further relates to a corresponding electronic transaction execution system, sales unit, transaction server as well as a computer program product for executing the corresponding method.

BACKGROUND OF THE INVENTION

Payment Services exist in many variants, both digital (electronic), as well as non-digital (physical) variants, or hybrid variants in which both use is made of electronic units and physical units. Known digital payment systems are arranged to perform a payment between two parties, such as a buyer and a seller. The buyer buys product, service or other material or property from a merchant/vendor/seller and payment is performed through a digital payment system arranged for that purpose to the amount agreed with the seller. This amount is included in the transaction instruction which consists in principle of two parties, being the seller and buyer, or in economic terms, a paying entity and payment receiving entity. The transaction instruction also includes the amount of the transaction, being the amount between the two parties to be transferred.

The known digital (electronic) payment systems typically consist of a POS or cash register system, and a server in connection therewith. The cash register system includes input means such as a keyboard or a touch screen which, for example can be used to enter the properties of the products to sell. On this basis, the cash register system can determine what the amount of the transaction instruction should be, in other words, the amount needs to be charged and transferred between the two parties. Such known cash register systems often further comprise a display screen or other type of display means that allows, for example, the amount of the transaction command to be displayed to the user.

The POS system of the known digital payment systems further include a card reader by which a bank card of a user can be read and a PIN code which can be entered on a keyboard connected to the card reader. Upon entering the correct PIN corresponding to the bank or credit card, which PIN is stored on the card, the POS system receives a message that the bank card is accepted, then, preferably after checking the credit limit of the associated bankcard, the amount of the user's bank account will be debited and credited to the seller's bank account.

Many sellers try to increase sales of their goods and services through the introduction of various commercial agreements. These may be agreements on receiving discount, earning (saving) points or other agreements between the user and the vendor. Such existing commercial arrangements are known in the form of customer cards or saving cards. These loyalty cards are issued as a simple paper or sometimes plastic card. The card is usually protected against abuse through the use of the material or on the cart attached characteristics to prevent users from copying it. These plastic or paper cards are issued by sellers and then provided with a name or other information relating to the user. That way the vendor can determine for that user, the general commercial arrangements or agreements that apply and the user might save or collect saving points with every purchase. The registration and administration of transaction agreements thus lies entirely with the vendor and is usually performed manually. More modern forms of such customer cards are also known, for example, a plastic card which is provided with a magnetic stripe, by which the card electronically by a separate magnetic card reader can be read out and thus can be determined whether this user is subject to the general commercial agreements and to identify this user.

Such systems, however, have several disadvantages. More and more retailers see the benefits of such loyalty cards and the associated increase in sales. There is thus a loyalty card issued by more and more vendors and many users have a range of loyalty cards for all individual sales representatives or sales agencies (stores). This is usually leads to more and more users refrain from loyalty cards because carrying all these loyalty cards is impractical. Another major drawback is that existing loyalty cards also require further action by the user. In other words, if a user makes a purchase at the seller he or she will have to grab the loyalty card, and the relevant commercial arrangements have to be executed, either manually or automatically, by the seller and possible also be incorporated in the electronic transaction instruction after which the electronic transaction instruction itself is yet to be executed and the bank card needs to be swiped through the card reader and PIN to be entered on the keyboard. These additional operations are as perceived as hindering operations by the users and can result in a decrease of usage of the loyalty or customer cards.

DESCRIPTION OF THE INVENTION

It is an object of the present invention to provide an improved method for performing an electronic transaction instruction.

It is a further object of the present invention to provide an improved method for performing an electronic transaction instruction between at least two parties in which agreements between the two parties and at least a third party can be executed concurrently with the transaction instruction.

It is yet a further object of the present invention to provide an improved method for performing an electronic transaction instruction wherein the electronic transaction instruction is performed between a mobile communication device of the user and a cash register or POS system of the seller, and wherein at least some of the disadvantages of the prior art are resolved or at least reduced.

According to a first aspect of the invention, a method is provided for providing and executing by a transaction server of a payment service, which payment service is performed over a distribution channel between at least two users registered to the service, being at least one buyer and at least one seller, wherein the transaction server can be accessed by a communication unit of the at least one buyer through a sales channel and can be accessed by a POS unit of the at least one seller, for executing the electronic transaction instruction between the at least one buyer and at least one seller, the method comprising the steps of:

obtaining, by the transaction server, from the communication unit of the buyer, a unique buyer identifier to identify the buyer;

obtaining, by the transaction server, from the POS unit of the seller, a unique seller identification code for identification of the seller;

authenticating, by the transaction server, by using the unique buyer identifier and the unique seller identification code of the buyer and seller, by consulting a user registry containing a list of unique users registered for said payment service;

processing, by the transaction server, at a successful authentication of both the buyer and the seller, of the electronic transaction instruction by charging the account balance of the buyer and the seller in accordance with the transaction instruction between buyer and seller;

obtaining, by the transaction server, of at least one commercial agreements in an agreement register, the agreements register including commercial agreements such as discounts, commissions or savings between the users registered to the payment service, wherein the commercial agreements including agreements between at least one of the group comprising the buyer and the seller, and at least one of the group comprising a further buyer and a further seller;

processing, by the transaction server, of the at least one retrieved commercial arrangement.

To tie the purchaser, e.g. the buyer, to the seller, also known as the merchant, and to increase sales, the seller may offer a customer or loyalty card such as these are known from the state of the art. However, the existing customer card has the disadvantage that it requires an extra card in addition to the bank card already required and the user must use for the transaction. Furthermore, the commercial agreements which the customer cart relates to, often have to be executed or processed manually in the POS system.

Nowadays more and more modern payment means are introduced as an alternative to conventional bank cards. Well-known examples are bank cards which make it possible by read-out wirelessly or (almost) without any contact, often they do not even need an additional PIN code. Also, use of payment with a mobile communication device increases. Since the market penetration of mobile communication devices such as smartphones, tablets or other similar mobile communication devices is already very high, almost every user has nowadays almost always such a device with him/her. This makes such a device perfectly suited as a payment device, especially because it is arranged to contain all kinds of authentication and security mechanisms.

The present invention provides a method of performing an electronic transaction instruction, being a payment between the seller and the buyer. The buyer to this end can make use of a communication unit. This can be a fixed communications device such as a computer or other means which can be used to communicate, preferably the device however, is a mobile communication unit such as a tablet, a laptop computer or more preferably a mobile phone and, even more particularly, a smartphone. Using this communication unit, it enables the buyer to purchase a product or service from the seller. Payment is made by the seller by means of a sales unit or POS unit which connects via a sales channel, or is arranged to this end, with the transaction server. The transaction server forms part of the payment service according to the invention. In an example, at least the sales unit is arranged to communicate with the transaction server, wherein the communication unit of the buyer communicates through the sales or POS unit with the transaction server. In a practical embodiment, the sales unit is a cash register system that is physically present in a physical store, and the communication unit is a smart phone that is configured to communicate locally on a short distance with the POS system. For example, this can be implemented when both are adapted for and communicate over a personal area network, but also, for example via a network beacon (such as IBEACON®), near field communications, Wi-Fi, Bluetooth, Bluetooth LE, etc. In another example, the communication unit is arranged to communicate directly with the transaction server, for example via a mobile data network or the like. The transaction server preferably consists of one or more physical or virtual servers that are located remotely, such as in a data centre.

In addition to the aforementioned example where the sales unit is a physical cash register system within a physical store, the invention provides in an example also an electronic sales unit wherein the sales channel isn't a physical channel such as a store, but an electronic environment such as a (virtual) web shop or content within a social media platform. In this case of an electronic environment the buyer and seller are brought into contact through the electronic environment.

Once the connection between the cash register system (or other sales unit) and the mobile communications device, being of the smartphone (or any other communication unit) is established, the POS system receives a first unique user ID for identification of the user. This need not be any personal information such as a name, address and/or telephone number. What is sufficient is a number or unique registration code. However, additional personal information such as name, address and the like can optionally be retrieved remotely or incorporated into the first user identifier. This additional personal information may also be obtained for example through a link with a social media account of this user (which may be the buyer and/or seller). This additional information can be remotely retrieved from the social media platform and stored locally by the transaction server. This information can, however, also be retrieved only if it is needed, wherein the local storage is therefore not necessary. In another example, the authentication is in whole or in part handled by the social media platform. Various social media platforms offer to this end APIs to those registered to this platform with the choice of using the account information (for example, a login name or email address along with a password) that is used by the platform to log in to the external service. In one example of the present invention, an API of a social media platform, therefore, is used in the authentication process within the payment service of the users who are registered for the payment service.

Communication between sales unit and transaction server, and/or between the communication unit and the transaction server and/or the communication between the sales unit and the communication unit is preferably encrypted to prevent abuse. Preferably, at least the encrypted communication with respect to the authentication, and the processing of the transaction.

Once the transaction server of both the communication unit (smartphone) as well as the sales unit (POS system) unique buyer and seller identification code are received, the buyer and seller will be authenticated by the transaction server to determine whether they are registered for the service.

The identification code of buyer may in particular be a unique ID that is related to the communication unit, for example, a mobile phone number, an IP address, a MAC address, SIM, or other related codes such as the IMSI, IMEI, etc. but also one in the communication unit stored code which is provided by a software application or by a hardware unit in the phone. The identification of the seller can be provided accordingly. It will be clear for the skilled person that also other solutions are possible.

The transaction server can look up the buyer and seller by checking the unique seller and unique buyer identification and whether they occur in a user registry. This user registry contains a list of all the unique users registered for the service. This is a simple example because the register except for a list of unique codes which are a representation of a buyer or seller, preferably also contains other information and the preferably the list is stored on the transaction server, but it can also be stored remotely in a further server and be read out by the transaction server remotely.

Once buyer and seller are authenticated and it is determined that they are both registered for the service the transaction server can process the electronic transaction instruction. This may be done by making a payment from the buyer to the seller, in which a fixed sales price of the balance of the account of the buyer will be debited and credited to the seller. In one example, the moments of debiting and crediting are not the same, but is the amount credited to the seller after a predetermined time has passed, or when use is made of a third party (preferably independent) at which party the amount is kept in the meantime between debiting and crediting. This, for example, until a period of time has lapsed, or until certain properties are met. This may include additional agreements between the buyer and the seller, but also between the two and a third party (buyer, seller or an independent party).

The balances and the amount may be expressed in currencies which are known to be legal payment currencies. However, these can also be virtual currency which make it possibly to use such currency being recognized as a monetary unit but not as legal currency. In particular, it may consist of a virtual currency, lawful currency like Euro, US dollars, etc. or cryptocurrency as bitcoins etc. Alternatively, it can also be a currency that is linked to one of the aforementioned (legal tender) currencies.

These balances belong, as mentioned, therefore, preferably to a balance of the system according to the invention, and are not linked to an existing bank account or known in principle. The balances can be registered within the transaction server as hard (physical or lawful) currency, but it may also be a virtual currency or any currency that are mutually accepted by the user and seller. However, preferably, it is a prepaid payment system on the basis of hard currency preferably in Euro. It can also be a credit card system, wherein each user a certain (monthly) spending or credit limit which is periodically replenished from an associated bank account. The buyer and seller have a (virtual) account within the system which is known to the transaction server as both are registered by their identification codes contained in the user registry. The parties can thus can have a positive, negative or zero balance within the system. Upon processing the electronic transaction instruction, the transaction amount included the electronic transaction instruction is deducted from one party and credited to the other party. In other words, the seller receives the agreed-upon sales amount of the user.

Preferably, prior to processing the transaction amount of electronic transaction instruction, the transaction server first checks if the instruction can be executed in accordance with a spending limit of the buyer. If this spending limit or amount is insufficient, the instruction will not be executed. The outcome of the transaction instruction is sent to the sales unit by the transaction server in the form of a transaction status message wherein this transaction status message is shown to the buyer assess successful completion or refusal of electronic transaction instruction. The message can also be sent to both the sales unit of the seller as to the communication unit of the buyer.

Further, preferably, a two-factor authentication may be requested, for example, when the amount to be processed from the transaction instruction is higher than a pre-determined amount, for example 10, 25 or 50 Euro.

The method according to the invention is further characterized by retrieving by the transaction server from an agreement register of commercial arrangements or agreements or contract details. These commercial agreements include loyalty agreements such as receiving or processing rebates, commissions or savings actions committed between buyers and sellers. However, in the agreements register also further agreements can be sorted between a buyer and seller and a third party which is initially not involved in this transaction. This third party, can be a further (second) buyer or further (second) are vendor or seller, but it may also be any other third party which not specifically has a role as a seller or buyer. One example is an intermediary such as the buyer and seller has brought together. The intermediary can be put to work on a commission basis for the seller or to provide services to this end. This commission can be processed by the agreements in accordance with the agreements register in a commission assignment. Upon retrieving the order from the register in accordance with this instruction, it may be executed in conjunction with the transaction. That is to say that the second transaction can be interwoven with the first. In this manner, the number of transactions is reduced. In prior art implementations still several separate instructions or actions have to be carried out in order to fulfil all requirements relating to the product or the service (the actual sale, as well as the marketing, commission and other arrangements or agreements which are expressed in the transaction operation), it may according to the invention all be processed in one and the same transaction. The number of parties that therefore is involved in a transaction is no longer limited to a buyer and seller (receiver/transmitter), but expanded to at least one additional party. This party can take any given role (buyer, seller, or party clustering as intermediary, etc.). In the same transaction are therefore all commercial agreements handled concerning the product or service in a transaction. As such, the number of parties in principle are unlimited, but preferably at least three (buyer, vendor and a third party), but may also be four, five, six, etc. are. The third party may be a buyer, seller, intermediary, agent commission, transaction agent, etc. are. The agreements and the deduction of balances takes place not only between the seller and buyer, but also between at least third party and as the buyer or seller, or a fourth party (buyer, seller, intermediary, etc.).

Once a transaction is going to take place or has taken place that meets predetermined requirements, the commercial agreement shall also be retrieved. Examples of the advance specified requirements are, e.g. presence of one of the parties in the transaction, or the amount corresponding to a predetermined amount, or that the transaction is related to a predetermined service or product. Examples of agreements are loyalty promotions, commissions, discounts, etc. When processing the transaction instruction, the transaction server therefor determines if these transaction-related commercial agreements with further parties are present. If they are, they are executed. Preferably, the commercial agreement is executed simultaneously with the transaction instruction, more in particular is the transaction instruction enriched with the commercial agreement or agreements to process or execute a command or action according to both the transaction (payment) and the agreements (commission).

An important advantage is that individual agreements can be made and can be executed between buyers mutually, between sellers mutually but above all between a buyer or seller which forms part of the transaction and a subsequent buyer or seller which initially is not involved in the transaction (or even between two other parties, such as a further buyer or seller and a further buyer or seller). Hence, for example, a buyer may receive an additional discount on a purchase if the buyer both has a commercial agreement/loyalty arrangement agreed with a first vendor as with a second vendor. It is also possible that the buyer upon purchase of a product from a product receives an extra discount which can be used upon making a further purchase from a (different) seller. The sellers may themselves make arrangements hence agreements that are executed once the initial transaction is executed.

However, also commission related examples are possible. For example, where the buyer purchases a product or service from a seller wherein part of the sales amount comprises a commission (commercial agreement from the register) which is attributed to the party who promotes the product. In particular, the latter example is in particular suitable for a social media platform. On such platforms there are several users (more or less known, e.g. celebrities) reregistered. Companies want to use the platform as a sales channel whereby this celebrity promote their products (or services). In this manner it is particularly easy to reach a young people, in particular a large group. In known payment systems, two separate transactions take place in such a situation. The potential buyer sees the product promoted by the celebrity on the social media platform and decides to buy this product. The first payment is between the (potential) buyer and the company that sells the product. The second payment than is yet to take place between the company and the celebrity for promoting and establishing the first transaction over all. These are not linked and cannot be processed in a job. With the system according to an example of the invention it is possible however. Thereby, the first transaction may comprise a related commercial arrangement that is stored in the register in which this arrangement requires that (at the same time with the transaction for example), there must be performed a further transaction between the seller and a further party (known person/celebrity), wherein the further party receive a portion of the amount of the transaction in the form of a commission.

The method therefore provides for a great advantage if there is a larger group of parties that have been registered. These parties (buyers, sellers, further buyers, and further sellers) can now mutually make some appointments and integrate these in the agreements with the buyer or the transaction. Purchase of a product by a user of a first vendor, for example, pursuant to a commercial agreement included in the registry agreement provide a 10% discount on a future purchase from the same vendor. This agreement, however, may be related to a second commercial arrangement, the second commercial agreement between the seller and a further seller is made and whereby the seller receives a commission from the further seller. As such between several parties mutually, various commercial agreements can be recorded and executed.

If the system includes multiple vendors/sellers, agreements may exist at various levels between the buyer and seller, between the buyer and another (further) seller, but also between sellers themselves, or even between buyers themselves. The system, in particular, the transaction server, is preferably arranged to link the agreements a currency, and to valuate this to a default currency for the system. The system has one standard, basic currency, base currency or local currency, and this is the currency of all transactions and the transaction agreements are translated into. Thus, a saving campaign with one seller can according to its own virtual currency deliver X number of loyalty points (virtual currency), and the virtual currency has a market value relative to the default base currency, for example, 1 point equals X Euro. The system may thus include multiple virtual currency that all be attributed back to the default base currency through the virtual currency exchange rate values. These rate values can be pre-entered, but can be adjusted in the interim. Likewise, rates are agreed between sellers themselves. One seller may have a virtual currency with related agreements and another seller may have other virtual currency with corresponding appointments. The system is preferably configured to include mutual exchange rates in which an agreement between one and another seller are included and which state the price at which the virtual currency from one seller may be substituted for the virtual currency of the other vendor. Practically a buyer may purchase from one seller, receive the loyalty points or currency under the commercial agreements with the seller, and use this loyalty with another vendor in accordance with the applicable commercial agreements, wherein the value of loyalty to one vendor against mutually agreed exchange rate represent a value of X loyalty with the other vendor.

In a further example with a transaction server, the steps of the processing of the electronic transaction instruction, as well as the obtaining and processing of the commercial arrangements are carried out by the further transaction server. The transaction server can be centrally located remote from but also locally at each vendor and thus locally connected to the POS system of the seller. In that case, the transaction server is in turn connected with a further remotely located central transaction server where the commercial agreements are stored and processed. Accordingly, the local or central transaction server may once again be connected to a separate authentication server that may handle authentication of the user and/or seller. Furthermore, not only the outcome of the transaction itself but also of the commercial arrangements appear to the user through the POS system.

In a second aspect, an electronic transaction instruction system is provided comprising a transaction server and at least one communication unit and at least a sales unit, the transaction server offering a payment service and executing the payment service for at least two users registered to the service over a sales channel the users being at the least one buyer and at least one seller, the execution of a transaction command, the transaction server comprising a communication unit which is arranged to communicate with the communication unit of the buyer and receiving a unique buyer identification code for identification of the buyer, and is arranged to communicate with the sales unit of the seller for receiving a unique seller identification code identifying the seller;

an authentication unit that is arranged to authenticate the buyer and seller by using the unique buyer identification code and unique seller identification code, the authentication unit comprising a user registry which comprises a list of unique users registered for the pay service;

a transaction processing unit which is adapted to, upon successful authentication of both the buyer and seller, processing the electronic transaction instruction by charging the balances of buyer and the seller in accordance with the transaction agreement between buyer and seller;

an agreements unit that is configured to execute commercial agreements and comprising an agreement registry, which agreement register comprises commercial agreement such as discounts, commissions or savings operations between the payment service registered users, the commercial agreement including agreements between at least one of the group comprising the buyer and the seller, and at least one of the group comprising a further buyer and a further seller, and is adapted to process the retrieved commercial agreements.

In a third aspect, there is provided a sales unit, such as a cash register system or a POS unit for an electronic transaction instruction system according to the above description.

In a fourth aspect, a transaction server is provided for an electronic transaction instruction system in accordance with the foregoing description.

In a fifth aspect, there is provided a non-volatile, non-transitory computer program product, comprising program code arranged to perform the method according to one of the foregoing descriptions, when the program code is loaded into a main memory of a computer and be executed by the computer.

In a further example, the program code means are adapted to be loaded as an application on the OS of the computer and to be executed by the operating system of the computer on the computer, wherein the computer, in particular, comprises one or more cores of a central processing unit of a mobile communication device.

In one example, there is provided a method of performing an electronic transaction instruction between a mobile communication device of a user, a checkout system or POS unit of a seller and one with the POS unit communicating transaction server, the method comprising the steps of:
  receiving, by the POS unit, over a first wireless connection with the mobile communication device of a first unique user ID for identification of the user;
  transmitting, by the POS unit, over a second connection with the transaction server of the first unique user ID, a second unique seller identifier identifying the seller and an electronic or digital transaction instruction;
  authenticating, by the transaction server, of the user by looking up the first unique user ID in a user registry comprising a list of unique user identification codes registered for the electronic transaction;
  authenticating, by the transaction server, of the seller by looking up the second unique seller ID in a seller register comprising a list of unique seller identification codes registered for the electronic transaction;
  processing, by the transaction server, of the electronic transaction instruction by settling or charging the balances of the user and the seller in accordance with the transaction agreement between the user and seller upon a successful authentication of the user and the seller;
  transmitting, by the transaction server, over second connection of a transaction status message to the POS unit;
  displaying, by the POS unit, of the transaction status message to the user and/or seller at the discretion of a successful conclusion, or rejection of the electronic transaction instruction, characterized in that the method further comprises the step of:
  retrieving, by the transaction server, from an arrangement register including commercial arrangement such as discounts, commissions or savings operations between users and sellers, of commercial agreements between the user and the seller;
  processing, by the transaction server, of the commercial agreements between the user and seller.

In one example, there is provided a method of performing an electronic transaction in accordance with one of the foregoing descriptions, further comprising a seller, the method further comprising the steps of:
  retrieving, by the transaction server, from the arrangement register of commercial agreements between the user and seller, between the user and the additional seller and between the seller and the subsequent seller;
  processing, by the transaction server, of the commercial arrangements between the user and seller, and between the user and further seller, and the seller and further seller.

In one example, there is provided a method of performing an electronic transaction in accordance with one of the foregoing descriptions, the method further comprising the steps of:
  verifying, by the transaction server, prior to processing the electronic transaction instruction, of the electronic transaction assignment for a financial spending limit of the user;
  processing, by the transaction server, of the electronic transaction instruction by settling or charging the balances of the user and the seller in accordance with the transaction instruction between the user and seller upon a successful authentication of the user and the seller as well as a successful verification of the electronic transaction instruction.

In an example, there is provided a method of performing an electronic transaction instruction according to any one of the foregoing descriptions, further comprising a transaction server, wherein the steps of the processing of the electronic transaction instruction, as well as the obtaining and processing of the commercial arrangements are carried out by the further transaction server.

In an example, there is provided a method of performing an electronic transaction instruction according to any one of the foregoing descriptions, the method further comprising the steps of:
  transmitting, by the transaction server, over the second connection of an arrangements status message to the POS system;
  displaying, by the POS system, of the arrangements status message to the user to assess the outcome of the processed commercial arrangements.

In an example, there is provided a method of performing an electronic transaction instruction according to any one of the foregoing descriptions, wherein the first connection comprises a wireless link being any one of the group consisting of IBeacon, Near Field Communication, Wi-Fi, Bluetooth, Bluetooth LE.

In an example, there is provided a method of performing an electronic transaction instruction according to any one of the foregoing descriptions, comprising an authentication server, the method further comprising the steps of:
  transmitting, by the transaction server, the first unique user ID to the authentication server;
  authenticating, by the authentication server, of the user in a user registry present at the authentication server;
  informing, by the authentication server, to the transaction server about a successful authentication of the user.

In an example, a method is provided of performing an electronic transaction instruction according to any one of the foregoing descriptions, further comprising the steps of:
- determining, by the transaction server, the height of the payable amount of the electronic transaction instruction and whether it exceeds a predetermined threshold;
- transmitting, by the transaction server, to the POS unit a request for the user to perform an additional authentication step;
- receiving, by the POS unit, from the user the additional authentication step, and wherein the additional authentication step is preferably a pin code.

In an example, there is provided an electronic transaction instruction system for processing of an electronic transaction with use of a mobile communication device of a user, which system comprises at least one point of sale, POS, unit of a merchant and at least one transaction server arranged for communicating with the POS unit, wherein the POS unit comprising a processing unit, a communication unit and an identification register, which processing unit is arranged to receive, by use of the communication unit, over a first wireless connection with the mobile communication device, a first unique user ID for identification of the user and is arranged for sending, over a second connection with the transaction server, the first unique user ID, and a second unique merchant ID identifying the merchant, as well as electronic transaction instruction, wherein the transaction server comprises a processing unit, a communication unit, a user's register and a merchant register and is arranged for authenticating the user by determining whether the first unique user ID is present in the user register, and authentication the merchant by determining whether the second unique merchant ID is present in the merchant register, as well as the processing of the electronic transaction instruction by settling or charging the balances of the user and the merchant in accordance with the transaction instruction between the user and merchant upon successful authentication of the user and the merchant, and sending over the second connection of a transaction status message to the POS unit, and where the POS unit is further arranged to display the transaction status message to the user for assessing successful completion or refusal of the electronic transaction instruction, wherein the transaction server further comprises an arrangements register, which arrangements register comprises commercial arrangements such as discounts, commissions or savings operations between users and merchants, and wherein the transaction server is arranged to retrieve and process the arrangements register the commercial arrangements between the user and the merchant.

DETAILED DESCRIPTION OF THE FIGURES

Figure 1:
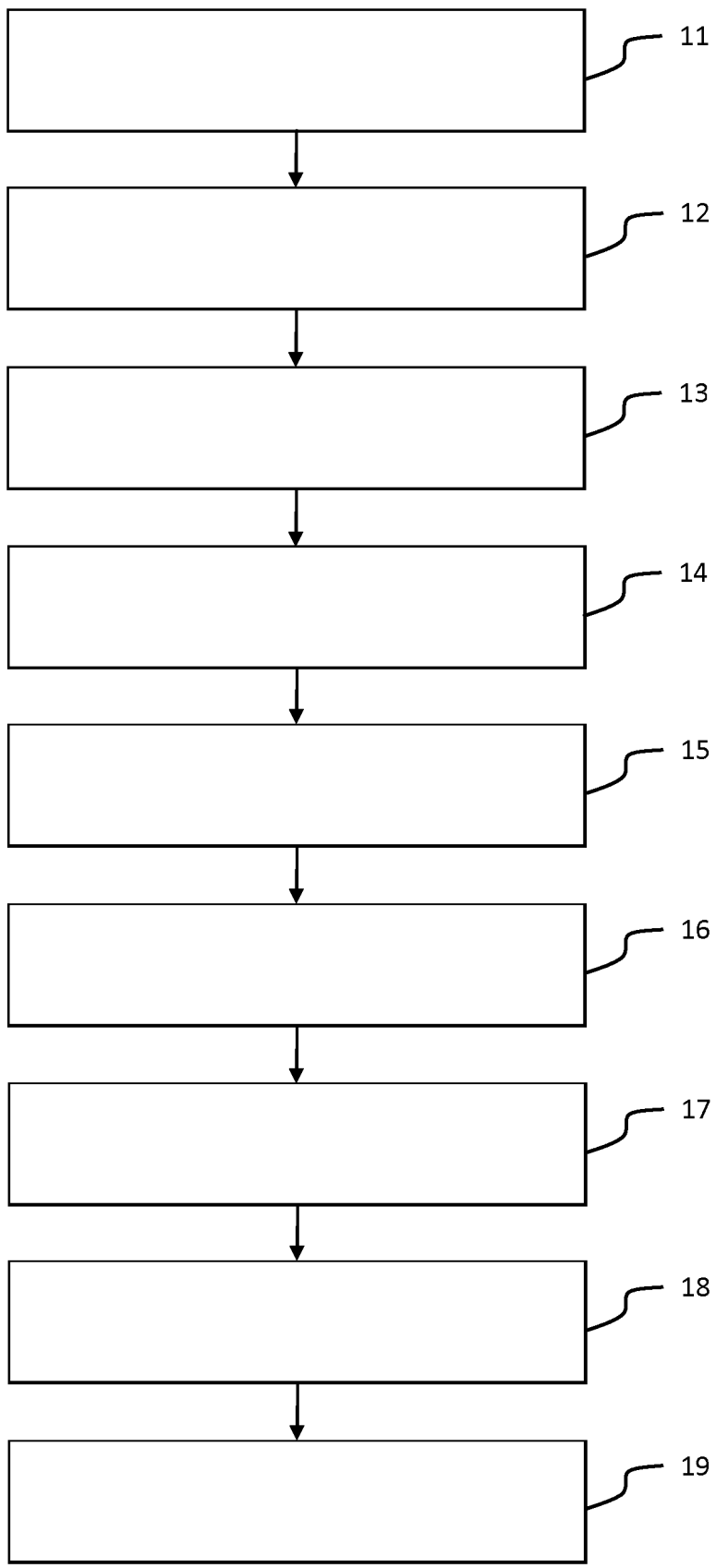
FIG. 1 shows the steps of the method of performing an electronic transaction instruction in accordance with an aspect of the invention.

FIG. 1 shows the various steps of the method of performing an electronic transaction instruction between a seller, vendor or merchant and a user, e.g. a buyer. In particular, the communication takes place with a mobile communications device, particular a smartphone. However, this also may be a tablet or other portable communications device that is able to wirelessly communicate with a cash register system or POS system. The POS system is for example a cash register system as there are many variants which are considered known to those skilled in the art and as set out in the various shops, restaurants and the like as long as the cash register system is arranged to communicate with a transaction server and (wireless) with a mobile communication device such as the aforementioned smartphone.

In a first step 11, the POS system receives a first unique user ID of the smartphone, over a first wireless connection. This wireless connection is preferably an IBeacon, Wi-Fi, Bluetooth, Bluetooth LE, Near Field Communication (NFC) or other wireless communication known in the art between smartphones and modern POS systems.

In a second step 12, the POS system sends, over a second connection with the transaction server, the first unique user ID code, to the transaction server. It also sent a second unique merchant ID code as well as the electronic transaction instruction to the transaction server.

In a third step, 13, the transaction server authenticates the user by looking up whether the first unique user ID is present in a user register that includes a list of unique users identification codes registered for electronic transaction.

In a fourth step, 14, the transaction server authenticates the merchant by looking up whether the second unique merchant ID is present in a merchant register that includes a list of unique merchant identification codes registered for electronic transaction.

The following fifth step 15, the transaction server processes the electronic transaction instruction by charging (debiting and corresponding crediting) in accordance with the transaction instruction, the balances of the user and merchant, such upon successful authentication of both the user and the merchant.

In the sixth step 16, the transaction server sends over the second connection, a transaction status message to the POS system, and in the seventh step 17, is the message presented by the POS system to the user to assess a successful completion or refusal of electronic transaction instruction.

In the subsequent eighth step 18, which step could be performed earlier in the process after the merchant and user are identified, the transaction server action will obtain commercial agreements in an agreements register. This agreements registry comprises commercial agreements such as discounts, commissions or savings operations between users and merchants. In a further embodiment herein also agreements are comprised between the user and other or further merchants, as well as agreements between the merchants mutually with the associated exchange rate which is determined by a value in hard currencies such as Euro according to which a virtual currency of the specific agreements is to be valued, as well as in the ratio in which the mutual currencies can be traded between the different merchants.

The final step is step 19, which, as step 18, can also be carried out earlier in the process, for example prior to the actual charging of the balances in step 15, or sending and displaying of the status message in step 16 and 17. This step is at least always performed after authentication of the user and merchant took place, hence, not prior to step 14. In step 19, the actual agreements between user and merchant, as agreed to and stored in the agreements registry, are actually processed and executed. That is, loyalty points are credited, discounts processed, commissions charged, etc.

Figure 2:
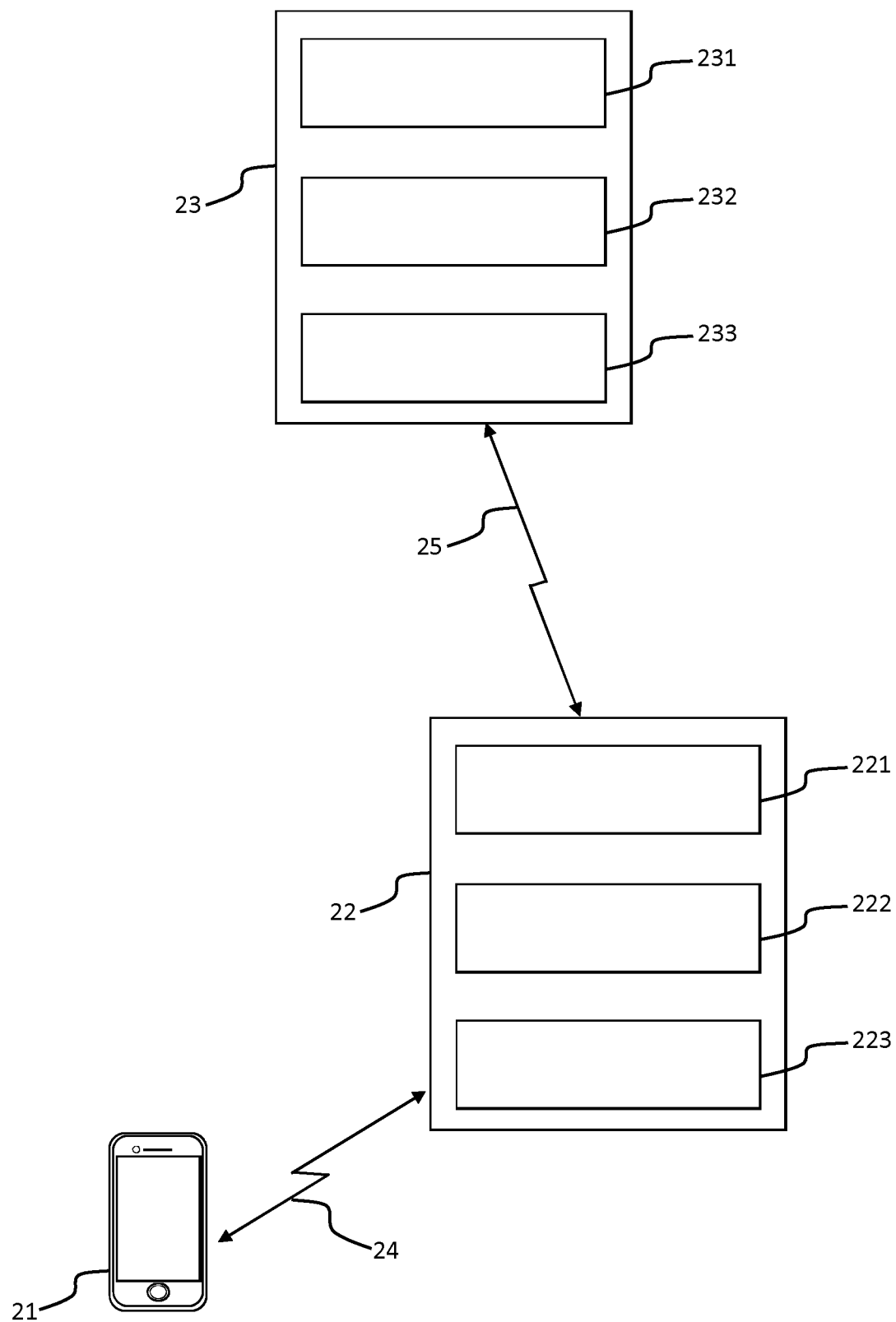
FIG. 2 shows schematically the different elements of an electronic transaction instruction system in accordance with an aspect of the invention.

In FIG. 2 the various elements of the system are shown. Three entities can be recognized, a smart phone 21 of the user (in this case, the purchaser), the cash register system or POS system 22 of the seller or merchant, and the transaction server 23 of the service provider of the transaction instruction system according to the invention. Between the three entities is communicated over a first connection or link 24 and a second connection 25. The first connection 24 takes place between the smart phone 21 and the POS system 22, and is wireless. This can take place for example in accordance with a IBeacon protocol, Bluetooth, Bluetooth LE, Wi-Fi, Near Field Communication, etc. It will be apparent to those skilled in the art that other forms of wireless communication are suitable and fall within the scope of the invention. This connection is wireless, and preferably encrypted. However, the first connection can alternatively take place directly between the smartphone 21 and transaction server 23, for example via an Internet connection or mobile data network.

The connection 25 may also be performed wirelessly between the transaction server and the POS system, for example, in the case of a mobile cash register system or a mobile payment terminal, but is preferably carried out wired. The communication between the transaction server 23 and the POS system 22 is preferably encrypted so that eavesdropping or manipulation of the information communicated between the entities is prevented.

The cash register system 22 of the electronic transaction instruction system comprises various components such as a central processing unit 221, a communication unit 222 and a merchant identification code register 223. The processing unit 221 is the central controller, the CPU, of the POS system and controls the communication unit for communication with the smart phone 21 and the transaction server 23. The communication unit 222 is on the one hand therefore arranged to communicate locally with the smartphone, for example with a suitable payment terminal which is comprised in the POS system. On the other hand, the communication unit 222 is arranged for communication, wireless or wired, with the transaction server 23. Both the smartphone as the cash register system having a unique identification code with which the cash register and thus the merchant, and the smartphone, and therefore the user within the system can be recognized by the transaction server. The smartphone sends the user identifier (purchaser identifier) to the POS system, preferably in encrypted form, and the cash register system sends it along with a merchant (seller) identification code to the transaction server 23, such together with the electronic transaction instruction itself. This instruction in a basic implementation only consists of an amount to be settled between the two parties, but may also include additional information such as date of execution, recipient, currency, etc.

Then the transaction server 23 has received the electronic transaction contract/instruction and the identification codes of the user and seller/merchant. The merchant identification code is compared to the merchant register (which can be part of the user registry in which all users, both buyer and seller/merchant are stored) 231. Therein all merchants are listed in the form of an identification code. If the merchant identification code of the POS system is not present in the merchant register 231, the POS system and so the merchant is not a party in the system, and therefore not a registered user, and the transaction will be aborted. The same is true for the user. This is based on the user identifier (purchaser identifier), which is received by the POS system from the smartphone and forwarded to the transaction server to be verified. Verification takes place by looked up in the user register 232 if the user identification is present. If this is not the case, then the transaction is aborted. Verification can also occur because the users (buyer and/or seller) are authenticated by an external service, such as a social media platform where the authentication is provided via an API.

If both the buyer and the seller are authenticated, the commercial agreements will be retrieved by the transaction server 23, which commercial agreements are carried out between the user and the seller, e.g. vendor or merchant. This is performed by the determining the relationship the buyer and seller, so the combination of that particular buyer and specific merchant in the appointment register 233. In this arrangement or appointment register 233 all agreements between the various entities of the system are stored, so between buyer A and seller Y, between buyer A and (further) seller Z, but also between seller Y and (further) seller Z. These can all be unique arrangements, with total freedom of interpretation thereof. What is meant is that vendor Y may agree, for example, that upon spending amount X by buyer A, X points are added to the loyalty program of seller Y. These points represent a certain reel value in an exchange rate which is to be determined by the merchant/seller in a base currency in which the system is working, in practice in Euro, but this could also be US dollars. By making use of the exchange of points of the savings from merchant Y, sellers can also make mutual agreements which can be expressed in the same value. Thus, merchant Y and the merchant Z may agree that user A can exchange one savings point of merchant Y for two savings points at merchant Z. Thus merchant Y and Z have mutually agreed in a commercial agreement that users can exchange points in a ratio 1:2. Merely by example this is explained in the form of loyalty or saving points, but it may also apply to other commercial arrangement such as discounts, participation in lotteries, special rates or whatever. The system is arranged to comprise all such agreements between the sellers/merchants, and the associated virtual currency, the value of the virtual currency expressed in real, hard currencies such as Euro, and the market value or exchange rate between the currencies.

Although the invention is set put on the basis of a number of aforementioned examples, the invention is by no means limited to such applications. The skilled person can make, on the basis of the following claims without inventive work modifications and variations, which are all be deemed to be comprised by these claims.

The invention claimed is:

1. A method of providing and performing by a transaction server of a payment service, which payment service is performed over a sales channel between at least two users registered to the service, being at least one buyer and at least one merchant, wherein the transaction server is accessible by means of the sales channel by a communication unit of the at least one buyer and is accessible by a sales unit of the at least one merchant, for processing between the at least one buyer and at least one merchant to an electronic transaction instruction, said method comprising the steps of:

obtaining, by said transaction server, from said communication unit of said buyer, of a unique buyer identifier code to identify said buyer;

obtaining, by said transaction server, from said sales unit of said merchant, of a unique merchant identification code to identify said merchant;

authenticating, by said transaction server, using said unique buyer identifier and said unique merchant identifier codes of said buyer and said merchant, by determining a presence of said codes in a user registry containing a list of unique users registered for said payment service;

processing, by said transaction server, upon a successful authentication of both said buyer and said merchant, of said electronic transaction instruction by charging balances of said buyer and said merchant in accordance with the transaction instruction between buyer and merchant;

obtaining, by said transaction server, of at least one commercial agreements in an agreement register, said agreements register comprising commercial agreements such as discounts, commissions or savings operations between the users registered for the payment service, said commercial agreements comprising agreements between at least one of the group consisting of said buyer and said merchant, and further at least one of the group consisting of a further buyer and a further merchant;

processing, by said transaction server, of the obtained at least one commercial agreement.

2. The method of claim 1, wherein the communication unit includes at least one of the group consisting of a wireless communication unit, a mobile communication unit and one fixed communication unit.

3. The method according to claim 1, wherein the sales sale unit comprises at least one of the group consisting of a wireless communication unit, a mobile communication unit and one fixed communication unit such as a physical cash register system.

4. The method according to claim 1, wherein the sales channel is a physical channel.

5. The method according to claim 1, wherein the sales channel relates to an electronic sales channel and provides in particular a sales channel via a social media platform.

6. A method according to claim 1, further comprising the steps of:

verifying, by said transaction server, prior to processing said electronic transaction instruction, of said electronic transaction instruction for a financial spending limit of the buyer;

processing, by said transaction server, of said electronic transaction instruction by settling the balances of the buyer and the merchant in accordance with the transaction instruction between the buyer and merchant upon a successful authentication of the buyer and the merchant and a successful verification of the electronic transaction instruction.

7. The method according to claim 1, further comprising a transaction server, wherein the steps of the processing of the electronic transaction instruction, as well as the obtaining and processing of the commercial arrangements are carried out by the further transaction server.

8. The method according to claim 1, the method further comprising the steps of:

sending, by said transaction server, of an arrangements status message to the sales unit, in particular being a physical cash register system;

displaying, by said sales unit, in particular being a physical cash register system, of said arrangements status message to said buyer to assess the outcome of the processed commercial agreements.

9. The method according to claim 1, wherein the connection between the communication unit of the buyer and the sales channel is arranged for one of the group consisting of IBeacon, Near Field Communication, Wi-Fi, Bluetooth, Bluetooth LE.

10. The method according to claim 1, wherein the connection between the communication unit of the buyer and the sales channel takes place via the sales unit, wherein the communication between the communication unit and the sales unit is arranged for short-range or local communication, in particular, Near Field communication or personal area network communication and communications between the sales unit and the transaction server is arranged for communication over a wide area network.

11. The method according to claim 1, comprising an authentication server, the method further comprising the steps of:

transmitting, by said transaction server, of said unique buyer identification to said authentication server;

authenticating, by said authentication server, of said buyer in a user registry present on said authentication server;

informing, by said authentication server, said transaction server upon a successful authentication of said buyer.

12. The method according to claim 1, further comprising the steps of:

determining, by said transaction server, the exact transaction sum of the purchase of said electronic transaction instruction and whether it exceeds a predetermined threshold;

transmitting, by said transaction server, to said sales unit of a request to the buyer to perform an additional authentication step;

receiving, by said selling unit, from said buyer of said additional authentication step, wherein said additional authentication step preferably involves a PIN.

* * * * *